Patented Oct. 31, 1944

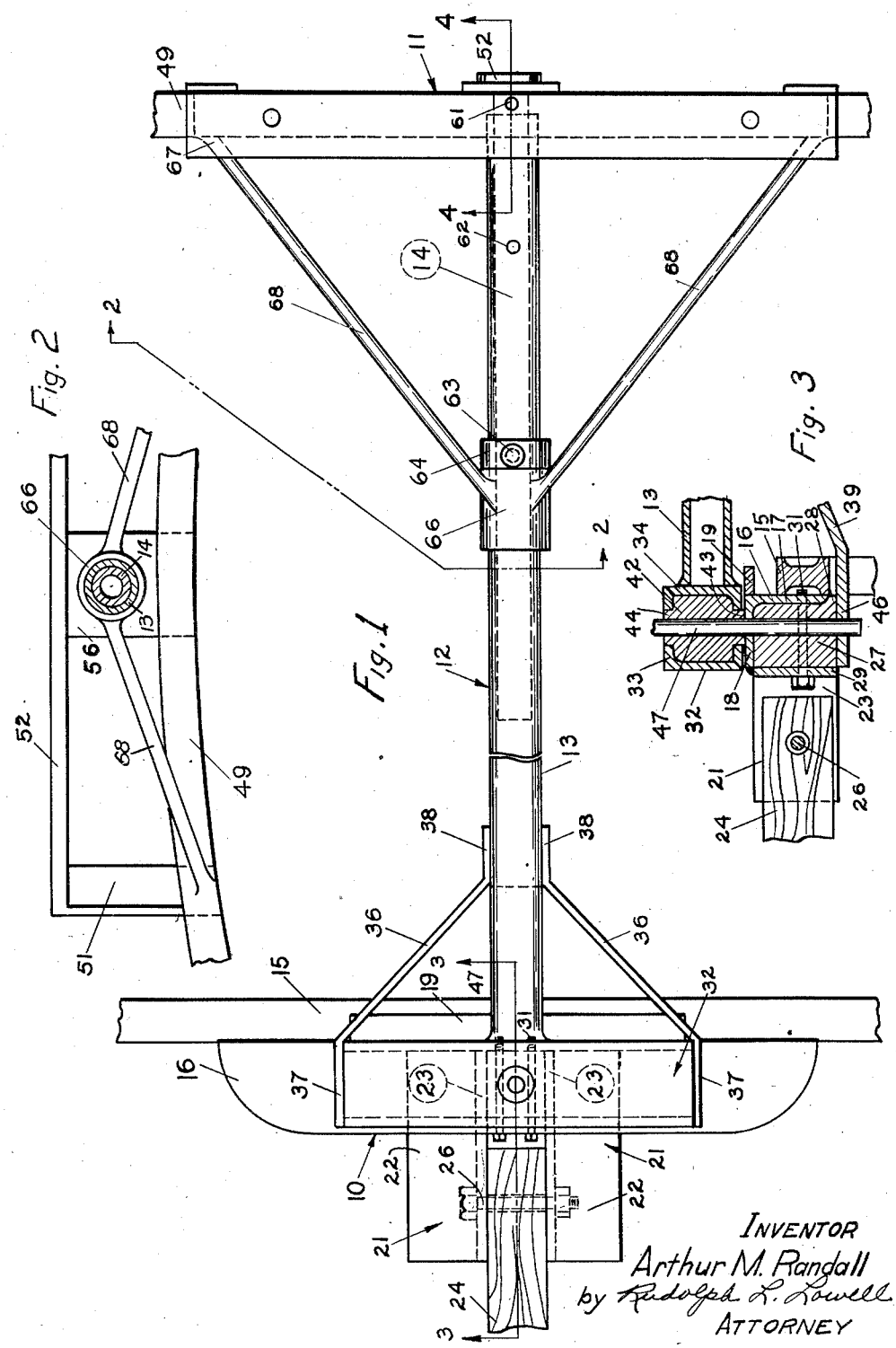

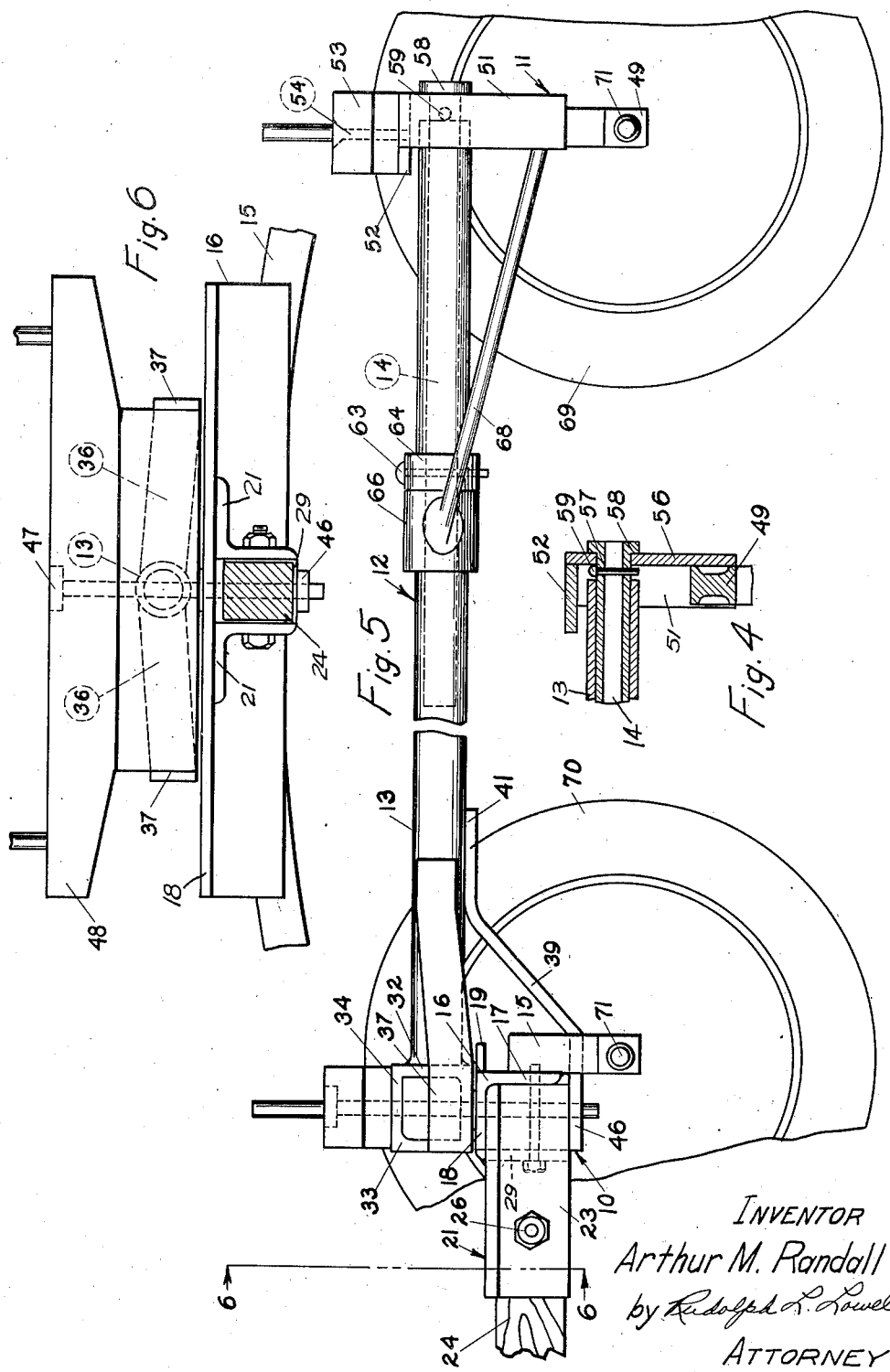

2,361,869

UNITED STATES PATENT OFFICE 2,361,869

VEHICLE

Arthur M. Randall, Prairie City, Iowa

Application February 26, 1944, Serial No. 524,120

4 Claims. (Cl. 280—116)

This invention relates generally to vehicles and in particular to a front gear for wagons, trailers and the like.

An object of this invention is to provide an improved wagon.

A further object of this invention is to provide a wagon having a front gear comprised of two preassembled welded units connected together for relative pivotal movement by a single king pin extended through bearing blocks carried within the preassembled units.

A feature of this invention is found in the provision of a wagon front gear which is comprised of a pair of welded steel units adapted to be assembled together for relative pivotal movement by a single king pin. Each unit includes a cast iron bearing block for receiving the king pin, with the blocks being constructed and arranged such that when the two units are assembled together relative pivotal movement takes place between cast iron and steel bearing surfaces.

Further objects, features and advantages of this invention will become apparent from the following description when taken in connection with the accompanying drawings in which:

Fig. 1 is a plan view of the wagon of this invention with the wheels and bolsters removed;

Fig. 2 is a sectional view taken on the line 2—2 in Fig. 1;

Fig. 3 is a sectional view as seen along the line 3—3 in Fig. 1;

Fig. 4 is a sectional view on the line 4—4 in Fig. 2;

Fig. 5 is a side elevational view of the wagon with a pair of wheels removed; and Fig. 6 is a view partly in section as seen along the line 6—6 in Fig. 5.

Referring to the drawings the wagon of this invention is shown in Figs. 1 and 5 as including a front gear 10 and a rear gear 11 connected together by an extensible tubular reach 12 comprised of a forward tubular member 13 in telescopic engagement with a reduced rear tubular member 14. The front gear 10 includes an axle 15 which is bowed upwardly over its central portion as shown in Fig. 6. Extended longitudinally of the front axle 15 is a supporting member 16 of angle shape having one leg 17 welded to the front side of the axle 15 and projected upwardly at least to the top level of the front axle. The other leg 18 of the angle member 16 is extended forwardly of the axle 15 in a substantially horizontal plane. An extension member 19 of a flat form is welded to the rear side and at the top of the upright leg 17 so as to be in the plane of the horizontal leg member 18 for a purpose which will be later noted. As clearly appears from Fig. 1 the angle member 16 terminates short of the ends of the axle 15, while the extension member 19 in turn terminates short of the ends of the angle member 16.

Hound members 21 of an angle shape are spaced longitudinally of and project forwardly from the angle member 16 (Figs. 1 and 5). The rear end portions of the hounds 21 are positioned within the angle member 16 with the horizontal hound legs 22 welded to the bottom side of the leg 18 of the angle member 16, and the rear ends of the vertical hound legs 23 welded to the front side of the leg 17 of the angle member 16. The hound legs 22 are thus located in a substantially horizontal plane and are extended in opposite directions from each other so that an open space is formed between the hounds 21 forwardly of the leg 18 of the angle member 16. The space between the hounds 21 is adapted to receive a wagon tongue 24 which is pivotally supported on a bolt 26 carried in the opposite vertical legs 23 of the hounds.

Located between the hounds 21 and within the angle member 16 is a bearing block 27 of a substantially rectangular shape having an end portion 28 extended below the vertical leg 17 of the angle member 16 (Figs. 3 and 5). The block 27 is held in this position by means including a holding plate 29 positioned vertically between the hounds 21 and against the block 27. Plate 29 is welded to the vertical legs 23 of the hounds and to the forward end of the leg 18 of the angle member 16.

Thus as clearly appears in Fig. 3 a channel-shaped structure is provided between the hounds 21, by the plate 29 and angle member 16. The block member 27 is received in this channel structure, with its end 28 projected from the open side of the channel for a purpose to be later explained. Screw bolts 31 are extended through the plate 29 and block 27 and are threadably engaged in the vertical leg 17 of the angle member 16 to hold the block 27 against movement.

A frame 32 for supporting the forward end of the reach member 13 on the front gear 10 is comprised of a pair of angle members 33 and 34 assembled and welded together to form an elongated box-like structure which is open at its ends. The reach member 13 is rigidly welded to the rear side of the frame 32 with the bottom side of the frame being movable across the horizontal table surface formed by the leg 18 of the angle member 16 and the extension 19. As shown in Fig. 1 the frame 32 is of a length substantially equal to the extension 19 and is normally in a superposed position on the central portion of leg 18 of the angle member 16. Arms 36 of an angulate form have one end 37 welded across an end of the frame 32 and are extended rearwardly and inwardly to the reach front member 13 to which they are welded at their opposite ends 38. The lower sides of the arms 36 are substantially in the plane of the bottom side of the reach-supporting frame 32. A bracket member 39 is welded at one end 41 to the bottom of the front reach member 13 and is bent downwardly and forwardly from the member 13 to a position below the rear end portions of the hounds 21 for a purpose to be later explained.

Carried in the frame 32 at its central portion is a bearing block 42 having a body portion of a shape corresponding to the cross sectional shape of the frame 32, so as to be receivable within the frame, and annular portions 43 and 44 projected from opposite ends of the body portion. The horizontal legs of the angle members 33 and 34, comprising the frame 32, are formed with aligned openings to receive corresponding annular portions 43 and 44, with the portion 43 being extended outwardly from the frame 32. In the assembly of the frame 32 the block 42 is positioned between the angle members 33 and 34 before these members are welded together.

It is thus seen that the front gear 10 is comprised of a pair of pre-assembled units, a first unit including the front axle 15, axle member 16, hounds 21 and bearing block 27; and a second unit including the frame 32 and bearing block 42. These two units are assembled together by positioning the angle member 16 between the free or lower end 46 of the bracket 39 and the bottom side of the supporting frame 32 (Figs. 1 and 3). The two pre-assembled units in structures are maintained in this relative assembly position for pivotal movement relative to each other by a single king pin 47 inserted through aligned openings in the bearing block 42, the leg 18 of the angle member 16, the bearing block 27 and the end 46 of the bracket 39.

As described above the end portion 28 of the bearing block 27 is extended across the lower end of the leg 17 of the angle member 16, and the annular portion 43 of the bearing block 42 is projected outwardly from the frame 32. In the assembly of the front gear 10, therefore, the annular portion 43 is in bearing engagement with the horizontal leg 18 of the angle member 16, while the end 28 of the bearing block 27 is in bearing engagement with the end 46 of the bracket 39. It is contemplated that the angle member 16 and bracket 39 be of steel or like material and the bearing blocks 27 and 42 be composed of cast iron to provide for iron and steel surfaces being in bearing engagement with each other.

Further the blocks 27 and 42 support the king pin 47 over relatively long supporting surfaces to eliminate any local wearing in the king pin which would otherwise take place adjacent the king pin openings in the angle members 33 and 34 of the frame 32, and in leg 18 of the angle member 16. Also the king pin openings in the frame 32 and angle member 16 are prevented by the blocks from wearing into an elongated shape so that the front gear 10 is capable of being retained in an upright position by the king pin over long periods of use.

As shown in Fig. 5 a front bolster 48 is movably carried directly on the top side of the reach-supporting frame 32 and is pivotally movable relative to the frame 32 about the king pin 47 which is inserted therethrough.

The rear gear 11 includes a rear axle 49 which is bowed upwardly similarly to the front axle 15 as shown in Fig. 2. Adjacent each end of the rear axle 49 is an upright member 51 of angle shape which is welded at its lower end to the axle 49. A flat member 52 is extended between and welded to the tops of the upright members 51 and supports a rear bolster 53 which is connected to the member 52 by bolts 54.

As mentioned above the front reach member 13 is rigidly connected with the rear side of the supporting frame 32. To provide for a relative pivotal movement of the front gear 10 and rear gear 11 in vertical planes transversely of the wagon the rear gear is pivotally connected with the reach rear member 14 in a manner now to be described.

Extended between and welded to the flat member 52 and the rear axle 49 is an upright plate member 56 having an opening 57 for rotatably receiving the reach member 14 (Fig. 4). Retention of the reach member 14 against axial movement relative to the plate member 56 is accomplished by flanging the rear end 58 of the reach member 14 rearwardly of the plate 56 and extending a pin 59 through the reach member 14 at a position forwardly of the plate member 56. It is seen, therefore, that the pin 59 and flanged end 58 are adapted for bearing engagement with opposite sides of the plate member 56 to in turn limit the axial movement of the member 14 in opposite directions.

Each of the reach members 13 and 14 are formed with oppositely arranged openings 61 and 62, respectively, which are movable into aligned positions on relative axial movement between the reach members. To hold the reach members 13 and 14 in an adjusted or relatively moved position a pin 63 is inserted within aligned openings 61 and 62. Concurrently with its positioning in the openings 61 and 62 the pin 63 is also inserted through a collar member 64 rotatably mounted on the front reach member 13 for a purpose now to be explained.

A second collar or sleeve 66 is rotatably supported on the reach member 13 forwardly of the collar 64 and in abutting engagement with the collar 64. Braces 68 are rigidly connected at one end to the sleeve 64 and at opposite ends 67 with corresponding end portions of the rear axle 49. On movement of the wagon forwardly the rear gear 11 is moved forwardly by the abutting engagement of the collars 64 and 66, and on rearward movement of the wagon is moved rearwardly by the engagement of the pin 59 with the upright plate member 56. With the sleeve 66 freely rotatable on the reach member 13 and the plate member 56 freely rotatable about the rear reach member 14 the rear gear 11 is freely pivotally movable in a plane transversely of the wagon. A free pivotal movement of the front gear 10 relative to the rear gear 11 is accomplished by virtue of the free rotation of the reach 12 relative to the plate member 56 and the collar member 66. The wheels 69 and 70 for the axles 49 and 15, respectively, are each supported on a spindle 71 which is rigidly secured to a corresponding axle in a predetermined relative position with an axle.

Although the invention has been described with respect to a preferred embodiment thereof it is to be understood that it is not to be so limited since modifications and changes can be made therein which are within the full intended scope of this invention as defined by the appended claims.

I claim:

1. In a wagon gear including a front axle, a supporting member comprised of an angle iron having one leg secured to a side of said axle, and the other leg extended forwardly from said axle and above the top level of said axle, a pair of angle-shape hound members longitudinally spaced on and positioned normal to said supporting member, with said hound members projected forwardly from said supporting member and located below the forwardly extended leg of said supporting member, each hound member having one leg in a vertical plane and said vertical legs being opposite each other, and the other legs of said hound members being extended in opposite directions to provide an open space between said hound members, means for securing said other legs of said hound members with the bottom side of the forwardly extended leg of said supporting member, a block member located within said open space adjacent the one leg of said supporting member, a reach-supporting frame pivotally movable across the top side of said forwardly extended leg, a block member carried within said frame and extended therethrough, and a king pin extended through said two block members and the forwardly extended leg of said supporting member.

2. In a front gear for a wagon, an axle unit including a front axle, a supporting member of angle shape having one leg secured to the front side of said axle and projected upwardly to at least the top level of said axle, with the other leg of said supporting member extended forwardly from said axle, a pair of hound members of angle shape projected from said one leg of the supporting member and beyond the forward end of said other leg of the supporting member, each of said hound members having a first leg secured to the bottom of said other supporting leg member, and a second leg positioned in an upright plane, with said second legs being opposite each other and said first legs extended in opposite directions to provide an open space between said second legs forwardly of the other leg of said supporting member, a bearing member removably secured between said second legs at the rear end portions thereof, a reach-supporting frame movably supported on the top of the other leg of said supporting member, a bearing member carried by said reach supporting frame in contacting engagement with the other leg of said supporting member, and a king pin extended through said two bearing members and the other leg of said supporting member to pivotally connect said front axle unit and supporting frame for relative pivotal movement.

3. In a wagon front gear, a pre-assembled unit including a front axle, an angle member having one leg welded to the front side of said axle and projected upwardly to at least the top level of said axle, with the other angle member leg extended forwardly of said axle, a pair of angle-shaped hound members supported in a spaced relation longitudinally of and normal to said angle member and adapted to receive a wagon tongue therebetween, with the rear end portions of said hound members being positioned against the front side of said one leg and the bottom side of said other leg of the angle member and welded to said two sides, a block member carried between the rear portions of said hound members and projected below the bottom level of said hound members, a second pre-assembled unit including a reach-supporting frame and a reach, said supporting frame being pivotally movable across the top side of said one leg, a second block member supported on said frame and extended below the bottom level of said frame for bearing engagement with the top side of said one leg, a supporting member projected downwardly and forwardly from said reach to a position adjacent to and below said first block member, and a king pin rotatably extended through said two block members, said other leg of the angle member, and said supporting member to pivotally connect said two pre-assembled units for relative pivotal movement.

4. In a front wagon gear, a pre-assembled unit including a front axle, an angle member extended longitudinally of said axle having one leg welded to a side of said axle and projected upwardly to at least the top level of said axle, with the other leg extended forwardly of said axle and constituting a flat supporting table, hound members spaced longitudinally of said angle member and positioned normal to said angle member, with the rear portions of said hound members being welded to and positioned below the level of said other angle member leg, a first supporting means carried between the rear portions of said hound members and the legs of said angle member, a second pre-assembled unit including a reach and a reach-supporting frame of a box-like structure extended longitudinally of said axle with its bottom side movable on said table, a second supporting means extended through said frame with its lower end in contacting engagement with said table, a brace member extended downwardly and forwardly from said reach to a position below and in bearing engagement with said first supporting means, and a king pin rotatably receivable through said two supporting means, said other leg of the angle member, and said brace member to pivotally connect said two preassembled units for relative pivotal movement.

ARTHUR M. RANDALL.